United States Patent [19]

Boyd et al.

[11] Patent Number: 5,804,051

[45] Date of Patent: Sep. 8, 1998

[54] ELECTRODEPOSITABLE COATING COMPOSITIONS CONTAINING HYDROXAMIC ACID AND DERIVATIVES THEREOF, AND THEIR USE IN A METHOD OF ELECTRODEPOSITION

[75] Inventors: Donald W. Boyd, Cheswick; Robert R. Zwack, Allison Park; Raphael O. Kollah, Pittsburgh; Gregory J. McCollum, Gibsonia, all of Pa.

[73] Assignee: PPG Industries, Inc., Pittsburgh, Pa.

[21] Appl. No.: 705,480

[22] Filed: Aug. 29, 1996

[51] Int. Cl.⁶ .......................... C25D 13/06; C25D 13/10
[52] U.S. Cl. .......................... 204/501; 204/500; 204/505; 524/210; 524/221; 524/226; 524/230; 524/901
[58] Field of Search .................................. 205/224, 229, 205/317; 204/488, 500, 501, 505, 506; 524/901, 210, 221, 226, 230, 232

[56] References Cited

U.S. PATENT DOCUMENTS

| | | | |
|---|---|---|---|
| 3,793,278 | 2/1974 | De Bona | 260/29.2 EP |
| 3,959,106 | 5/1976 | Bosso et al. | 204/181 |
| 3,984,299 | 10/1976 | Jerabek | 204/181 |
| 4,007,154 | 2/1977 | Schimmel et al. | 260/37 EP |
| 4,008,192 | 2/1977 | Mijs et al. | 260/18 TN |
| 4,104,147 | 8/1978 | Marchetti et al. | 204/181 C |
| 4,148,772 | 4/1979 | Marchetti et al. | 260/292.2 EP |
| 4,197,224 | 4/1980 | Schmolzer et al. | 260/22 TN |
| 4,423,166 | 12/1983 | Moriarity et al. | 523/414 |
| 4,444,954 | 4/1984 | Mels et al. | 525/124 |
| 4,468,307 | 8/1984 | Wismer et al. | 204/181 |
| 4,781,808 | 11/1988 | Geist et al. | 204/181.7 |
| 4,891,111 | 1/1990 | McCollum et al. | 204/181.7 |
| 4,931,157 | 6/1990 | Valko et al. | 204/181.7 |
| 5,096,556 | 3/1992 | Corrigan et al. | 204/181.7 |
| 5,188,716 | 2/1993 | Schwerzel et al. | 204/181.7 |
| 5,283,269 | 2/1994 | Huemke et al. | 523/404 |
| 5,308,498 | 5/1994 | Fong et al. | 210/697 |
| 5,401,823 | 3/1995 | Huemke et al. | 528/45 |

FOREIGN PATENT DOCUMENTS

| | | |
|---|---|---|
| 0 343 831 | 11/1989 | European Pat. Off. . |
| 0 526 786 | 2/1993 | European Pat. Off. . |

OTHER PUBLICATIONS

Polarographic Study of Extraction Equilibria of Lead Complexes with Selected Bidentate Ligands, by E. Uhlemann et al, 1978 * (English Translation taken from Analytica Chimica Acta. 100:635–642, 1978).

*Primary Examiner*—Kathryn L. Gorgos
*Assistant Examiner*—William T. Leader
*Attorney, Agent, or Firm*—Kenneth J. Stachel

[57] ABSTRACT

An electrodepositable composition is provided comprising: (a) active hydrogen-containing, cationic salt group-containing resin electrodepositable on a cathode; (b) at least one at least partially capped polyisocyanate curing agent; (c) at least one metal-containing catalyst; and (d) at least one material having the following general formula:

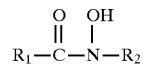

wherein $R_1$ is alkyl or substituted alkyl having 1 to 18 carbon atoms or aryl or substituted aryl; and $R_2$ is hydrogen, alkyl or substituted alkyl having 1 to 18 carbon atoms or aryl or substituted aryl. The composition can demonstrate enhanced corrosion resistance at low metal catalyst levels without loss of cured film properties or appearance when electrodeposited and cured over conductive substrates.

32 Claims, No Drawings

ELECTRODEPOSITABLE COATING COMPOSITIONS CONTAINING HYDROXAMIC ACID AND DERIVATIVES THEREOF, AND THEIR USE IN A METHOD OF ELECTRODEPOSITION

BACKGROUND OF THE INVENTION

The present invention relates to aqueous dispersions containing cationic resins and hydroxamic acid and derivatives thereof, and to their use in electrodeposition.

The application of a coating by electrodeposition involves depositing a film-forming composition to an electrically conductive substrate under the influence of an applied electrical potential. Electrodeposition has gained prominence in the coatings industry because in comparison with nonelectrophoretic coating methods, electrodeposition provides higher paint utilization, outstanding corrosion resistance, and low environmental contamination. Early attempts at commercial electrodeposition processes used anionic electrodeposition where the workpiece being coated served as the anode. However, in 1972 cationic electrodeposition was introduced commercially. Since that time, cationic electrodeposition has become increasingly popular and today is the most prevalent method of electrodeposition. Throughout the world many motor vehicles are manufactured with a primer coating by cationic electrodeposition.

Many cationic electrodeposition compositions used today are based on active hydrogen-containing resins derived from a polyepoxide and a capped polyisocyanate curing agent. These cationic electrodeposition compositions contain organic metal catalysts such as dibutyl tin oxide and metal compounds to activate cure of and provide corrosion resistance for the electrodeposition composition. Because of cost and environmental considerations, the levels of these metals are kept low. Metal catalysts can be relatively expensive and appear in the ultrafiltrate of electrodeposition baths, which can present waste disposal problems. However, low levels of metals may lessen the cure response of a coating composition and provide weaker corrosion resistance and appearance properties in the cured film than desired.

An example of an electrodepositable coating composition is that of Schmolzer et al. in U.S. Pat. No. 4,197,224. The electrodepositable compositions have at least one resin component modified with an at least partially masked polyisocyanate. Such a polyisocyanate has been modified through reaction to result in a radical in the capped portion of the molecule that is reduced by one reactive hydrogen atom from a saturated or unsaturated alcohol, or a phenol, an alkyl substituted phenol, or a cyclic lactam or an aldoxime or ketoxime or an aceto acetic acid ester or a hydroxamic acid ester.

It would be desirable to provide an electrodepositable composition which demonstrates enhanced corrosion resistance at low metal catalyst levels without loss of cured film properties or appearance.

SUMMARY OF THE INVENTION

In accordance with the present invention, an electrodepositable composition and a method of electrodeposition using the composition are provided. The electrodepositable composition comprises (a) active hydrogen-containing, cationic salt group-containing resin electrodepositable on a cathode; (b) at least one at least partially capped polyisocyanate curing agent; (c) at least one metal-containing catalyst; and (d) at least one material having the following general formula:

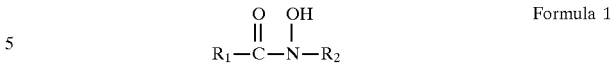

wherein $R_1$ is alkyl or substituted alkyl having 1 to 18 carbon atoms or aryl or substituted aryl; and $R_2$ is hydrogen, alkyl or substituted alkyl having 1 to 18 carbon atoms or aryl or substituted aryl.

DETAILED DESCRIPTION

The cationic resin of the present invention may be any suitable cationic resin known to those skilled in the art, but is preferably derived from a polyepoxide and can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt group former to produce the cationic resin.

A chain extended polyepoxide is typically prepared as follows: the polyepoxide and polyhydroxyl group-containing materials are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is typically conducted at a temperature of about 800° C. to 1600° C. for about 30 to 180 minutes until an epoxy group-containing resinous reaction product is obtained.

The equivalent ratio of reactants; i.e., epoxy:polyhydroxyl group-containing material is typically from about 1.00:0.50 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of polyhydric alcohols such as cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl)cyclohexane. The preferred polyepoxides have epoxide equivalent weights ranging from about 180 to 2000, preferably from about 186 to 1200. Epoxy group-containing acrylic polymers can also be used. These polymers typically have an epoxy equivalent weight ranging from about 750 to 2000.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogens associated with the cationic resin include any active hydrogens which are reactive with isocyanates within the temperature range of about 93° to 204° C., preferably about 121° to 177° C. Typically, the active hydrogens are selected from the group consisting of aliphatic hydroxyl and primary and secondary amino, including mixed groups such as hydroxyl and primary amino. Preferably, the cationic resin will have an active hydrogen content of about 1 to 4 milliequivalents, more preferably about 2 to 3 milliequivalents of active hydrogen per gram of resin solids.

The resin contains cationic salt groups, which are preferably incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If pplyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above-mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50° to 1500° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. By "sulfamic acid" is meant sulfamic acid itself or derivatives thereof; i.e., an acid of the formula:

Formula 2 wherein R is hydrogen or an alkyl group having 1 to 4 carbon atoms. Sulfamic acid is preferred. Mixtures of the above-mentioned acids may also be used.

The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably, the reaction temperature is in the range of about 60° to 100° C. Solvents such as a sterically hindered ester, ether, or sterically hindered ketone may be used but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in the composition of the present invention. Examples of these resins and their method of preparation are described in U.S. Pat. No. 3,793,278 to DeBona and U.S. Pat. No. 3,959,106 to Bosso et al.

The extent of cationic salt group formation should be such that when the resin is mixed with an aqueous medium and other ingredients, a stable dispersion of the electrodepositable composition will form. By "stable dispersion" is meant one that does not settle or is easily redispersible if some settling occurs. Moreover, the dispersion should be of sufficient cationic character that the dispersed resin particles will migrate toward and electrodeposit on a cathode when an electrical potential is set up between an anode and a cathode immersed in the aqueous dispersion.

Generally, the active hydrogen-containing, cationic salt group-containing resin in the electrodepositable composition of the present invention contains from about 0.1 to 3.0, preferably from about 0.1 to 0.7 milliequivalents of cationic salt group per gram of resin solids. The cationic resin is preferably nongelled, having a number average molecular weight ranging from about 2000 to about 15,000, preferably from about 5000 to about 10,000. By "nongelled" is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure. The active hydrogen-containing, cationic salt group-containing electrodepositable resin is usually present in the electrodepositable composition in an amount ranging from about 40 to 90 percent by weight, preferably from about 50 to 80 percent by weight based on the total weight of resin solids.

The electrodepositable composition of the present invention also contains a capped polyisocyanate curing agent. The polyisocyanate curing agent may be a fully capped polyisocyanate with substantially no free isocyanate groups, or it may be partially capped and reacted with the resin backbone as described in U.S. Pat. No. 3,984,299. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol may be used as a capping agent for the polyisocyanate in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime and lactams such as epsilon-caprolactam.

The polyisocyanate curing agent is usually present in the electrodepositable composition in an amount ranging from about 5 to 60 percent by weight, preferably from about 25 to 50 percent by weight based on total weight of resin solids.

Metal catalysts are also present in the electrodepositable composition of the present invention, normally in the form of a dispersion. The catalysts, which are often solids, are typically dispersed in a conventional pigment grinding vehicle, such as those disclosed in U.S. Pat. No. 4,007,154, by a grinding or milling process. The catalysts are typically used in amounts of about 0.005 to 2 percent by weight metal based on weight of total solids in the composition of the present invention. Suitable catalysts include tin compounds such as dioctyltin oxide and dibutyltin oxide, and lead-containing compounds such as lead silicate, lead cyanamide, lead oxide, and lead salts. Bismuth-, manganese-, and zinc-containing compounds as known to those skilled in the art are also suitable.

Mixtures of the above-mentioned metal compounds may also be used.

The material of component (d) in the electrodepositable composition is hydroxamic acid or a nonpolymeric derivative thereof and has the following general formula:

Formula 1 wherein $R_1$ is alkyl or substituted alkyl having 1 to 18 carbon atoms or aryl or substituted aryl. $R_1$ may be linear or branched alkyl, substituted or unsubstituted, saturated or unsaturated. Examples of suitable alkyl groups include groups such as methyl, propyl, hexyl, nonyl, dodecyl and the like. Suitable substituents include aryl, alkoxy, hydroxy, and amino. $R_1$ may also be substituted or unsubstituted aryl such as phenyl. Suitable substituents include alkyl or alkoxy having 1 to 10 carbon atoms, aryl, hydroxyl, and amino. $R_1$ is preferably nonyl. $R_2$ is hydrogen, alkyl or substituted alkyl having 1 to 18 carbon atoms or aryl or substituted aryl. $R_2$ may be linear or branched alkyl, substituted or unsubstituted, saturated or unsaturated. Examples of suitable alkyl groups include groups such as methyl, hexyl, decyl, dodecyl and the like. Suitable substituents include aryl, alkoxy, hydroxy, and amino. $R_2$ may also be substituted or unsubstituted aryl. Suitable substituents include alkyl or alkoxy having 1 to 10 carbon atoms, aryl, hydroxyl and amino. $R_2$ is preferably phenyl, methyl or hydrogen.

Nonexclusive examples of hydroxamic acids include benzohydroxamic acid, N-phenylbenzohydroxamic acid, N-methylbenzohydroxamic acid, oleyl hydroxamic acid, and decyl hydroxamic acid, which is preferred ($R_1$ is nonyl and $R_2$ is hydrogen).

The hydroxamic acid or derivative material having the structure of Formula 1 may be incorporated into the electrodepositable composition in several ways in its free unreacted form of Formula 1, for instance, as hydroxamic acid and/or derivative material such as esters. It may be added to the final reaction mixture of the main vehicle; i.e., the active hydrogen-containing resin, just before solubilization with water and acid as described above. This is the preferred method of incorporation. Alternatively, it may be added to a partially solubilized resin kept at sufficiently high solids so as to be sheared into the final composition. By "partially solubilized", it is meant that the resin is fully neutralized with respect to acid functionality but not completely water-thinned, i.e., diluted. Additionally, it may be co-dispersed with polyepoxide-polyoxyalkylene-polyamine modifying anti-crater resins such as those described in U.S. Pat. No. 4,423,166. It may also be dispersed in a conventional pigment grinding vehicle such as those disclosed in U.S. Pat. No. 4,007,154, by a grinding or milling process, and be a component of a pigment paste.

The hydroxamic acid or derivative material is usually present in the electrodepositable composition in an amount ranging from about 0.1 to 3.0 percent by weight based on weight of main vehicle resin solids; i.e., the active hydrogen-containing cationic resin and capped polyisocyanate curing agent, preferably from about 0.4 to 1.5 percent by weight based on weight of main vehicle resin solids.

At low lead levels in conventional systems; i.e., from about 0.005 to 0.1 percent lead by weight based on weight of total solids, the corrosion resistance of the cured coating can be a problem. The presence of the material having the structure of Formula 1 in the electrodepositable composition allows for the use of relatively low levels of lead compounds with good corrosion resistance properties.

The electrodepositable composition may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to about 40 percent by weight, preferably ranging from about 0.05 to 25 percent by weight based on total weight of the electrodepositable composition.

The electrodepositable composition of the present invention may further contain pigments and various other optional additives such as plasticizers, surfactants, wetting agents, defoamers, anti-cratering agents, catalysts, film build additives, flatting agents, and additives like those of U.S. Pat. No. 4,423,166 to enhance flow and appearance of the composition, and cationic microgels like those of U.S. Pat. No. 5,096,556, and pH control additives such as at least partially neutralized polyepoxide-amine adducts with higher pH sufficient to adjust the pH of the bath to the aforementioned desired range, if necessary.

Examples of suitable surfactants and wetting agents include alkyl imidazolines such as those available from Geigy Industrial Chemicals as GEIGY AMINE C and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyepoxide-polyoxyalkylene-polyamine reaction products such as those described in U.S. Pat. No. 4,423,166. These optional ingredients, when present, are usually used in an amount up to 30 percent by weight, typically about 1 to 20 percent by weight based on weight of resin solids.

Suitable pigments include, for example, iron oxides, lead oxides, strontium chromate, carbon black, coal dust, titanium dioxide, talc, clay, silica, lead silicate, and barium sulfate, as well as color pigments such as cadmium yellow, cadmium red, chromium yellow and the like. The pigment content of the aqueous dispersion generally expressed as the pigment to resin (or pigment to binder) ratio (P/B) is usually about 0.05:1 to 1:1.

The composition of the present invention comprising the cationic resin, the capped polyisocyanate curing agent, the catalyst, the hydroxamic acid or derivative material, and the optional additives mentioned above is used in an electrodeposition process in the form of an aqueous dispersion.

By "dispersion" is meant a two-phase transparent, translucent, or opaque aqueous resinous system in which the resin, pigment, and water insoluble materials are in the dispersed phase while water and water soluble materials comprise the continuous phase. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion. The dispersion is a stable dispersion as is defined above.

The hydroxamic acid or derivative material in the electrodepositable composition of the present invention can improve the corrosion resistance of the composition when it is used in an electrocoating process. Cationic electrodeposition compositions are conventionally formulated with lead as either a pigment or a soluble lead compound. Low lead levels in these compositions are generally preferred to reduce waste treatment costs. However, the presence of lead improves corrosion resistance over bare or marginally pre-treated steel. The hydroxamic acid or derivative material in the electrodepositable composition of the present invention allows for the use of low levels of lead compounds in the composition while maintaining effective corrosion performance. By "low levels" is meant about 0.005 to 0.1% lead based on weight of total solids.

The hydroxamic acid or derivative material in the electrodepositable composition of the present invention also can improve the cure response of the composition when the composition is used in an electrocoating process. This means that the temperature range for curing of the electrodepositable composition of the present invention may be about 275° to 325° F. (135° to 162.7° C.) as opposed to 325° to 400° F. (162.7° to 204.4° C.) for conventional electrodepositable compositions at conventional metal catalyst levels; i.e., about 0.2 to 2.0 percent by weight metal based on the weight of total solids. The composition of the present invention also demonstrates improved cure response as measured by solvent resistance when cured at underbake temperatures (about 310° F., 154.5° C.) compared to conventional electrodepositable compositions without the hydroxamic acid or derivative material, once again at optimized metal catalyst levels. Moreover, the cure rate is improved; i.e., at a given temperature, a deposited film of the present invention cures more quickly than a comparable film without the hydroxamic acid or derivative material, as measured by rate of weight loss of a deposited film during baking. Alternatively, the amount of metal catalyst can be reduced while maintaining cure at normal temperatures.

In the process of electrodeposition, the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. The film will contain the active hydrogen-containing resin, the capped polyisocyanate curing agent, the tin catalyst, the hydroxamic acid or derivative material, and the optional additives from the nonaqueous phase of the dispersion. Electrodeposition is usually carried out at a constant voltage in the range of from about 1 volt to several thousand volts, typically between 50 and 500 volts. Current 30 density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like, can be coated with the electrodepositable composition of the present invention. Steel substrates are preferred. It is customary to pretreat the substrate with a phosphate conversion, usually a zinc phosphate conversion coating, followed by a rinse which seals the conversion coating.

After electrodeposition, the coating is heated to cure the deposited composition. The heating or curing operation is usually carried out at a temperature in the range of from 275 to 400° F. (135°to 204.4° C.), preferably from 300° to 340° F. (148.8 to 171.1° C.) for a period of time ranging from 10 to 60 minutes. The thickness of the resultant film is usually from about 10 to 50 microns.

The invention will be further described by reference to the following examples. Unless otherwise indicated, all parts are by weight.

EXAMPLE I

Examples IA to IF illustrate the effect of adding benzohydroxamic acid, N-phenylbenzohydroxamic acid, N-methyl benzohydroxamic acid, oleyl hydroxamic acid, and decyl hydroxamic acid at equal molar levels, to a cationic electrocoating composition having normal lead silicate (1.5% on total solids) and dibutyltin oxide (0.91% on total solids) levels.

EXAMPLE IA (CONTROL)

This example describes the preparation of a cationic electrodeposition bath containing no additive. A main vehicle as prepared from the following ingredients:

| Ingredients | Parts by Weight |
| --- | --- |
| EPON 828[1] | 614.68 |
| Bisphenol A-ethylene oxide adduct (1:6 molar ratio) | 250.00 |
| Bisphenol A | 265.42 |
| Methyl isobutyl ketone | 59.48 |
| Ethyltriphenyl phosphonium iodide | 0.6 |
| Crosslinker[2] | 682.85 |
| Diketimine[3] | 56.01 |
| N-methyl ethanolamine | 48.68 |

[1]Polyglycidyl ether of Bisphenol A, available from Shell Oil and Chemical Co.
[2]A capped polyisocyanate crosslinker was prepared from the following mixture of ingredients:

| Ingredients | Parts by Weight |
| --- | --- |
| Polyisocyanate[a] | 1325.00 |
| Methyl isobutyl ketone (MIBK) | 221.81 |
| 2-(2-Butoxyethoxy) ethanol | 162.23 |
| Dibutyltin dilaurate (DBTDL) | 0.2 |
| 2-Butoxy ethanol | 1063.62 |

[a]Mixture of diphenyl-4,4'-diisocyanate and polyphenyl polyisocyanate, available from Bayer Corp. as MONDUR MR.
The polyisocyanate, MIBK, and DBTDL were charged to a reaction flask under a nitrogen atmosphere. 2-(2-Butoxyethoxy)ethanol was added slowly allowing the reaction mixture to exotherm to a temperature between 45° C. and 50° C. Upon completion of the addition, the reaction mixture was held at 50° C. for 30 minutes. 2-Butoxy ethanol was then added and the mixture allowed to exotherm to 110° C. and held there until infrared analysis indicated complete consumption of the isocyanate.
[3]Diketimine derived from diethylene triamine and methyl isobutyl ketone (MIBK) (73% solids in MIBK).

A reaction vessel was charged with the EPON 828, Bisphenol A-ethylene oxide adduct, Bisphenol A and MIBK. This mixture was heated under a nitrogen blanket to 1250C. Ethyl triphenyl-phosphonium iodide was then added and the reaction mixture allowed to exotherm to a temperature of about 145° C. The reaction was held at 1450° C. for two hours and the epoxy equivalent weight was determined. At this point, the crosslinker, the diketimine, and N-methyl ethanolamine were added in succession. The reaction mixture exothermed and then a temperature of 1320° C. was established and maintained for an hour. The resin mixture (1684 parts) was dispersed in aqueous medium by adding it to a mixture of 38.34 parts sulfamic acid and 1220.99 parts deionized water. The dispersion was further thinned with 657.63 parts deionized water and 666.28 parts deionized water in stages and vacuum stripped to remove organic solvent to yield a dispersion having a solids content of 41.4 percent and a particle size of 984 Angstroms.

A cationic electrodeposition bath was prepared from the following ingredients:

| Ingredients | Parts by Weight |
| --- | --- |
| Main vehicle prepared above in IA | 1395.8 |
| Co-resin 1[1] | 168.2 |
| Butyl CARBITOL formal plasticizer[2] | 27.1 |
| Co-resin 2[3] | 73.9 |
| Deionized water | 1943.7 |
| E-6066 paste[4] | 191.3 |

[1]An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flexibilizer-flow control agent was dispersed in aqueous medium with the aid of lactic acid and the dispersion had a resin solids content of 35.4%.
[2]The reaction product of 2 moles of diethylene glycol butyl ether and 1 mole of formaldehyde, prepared as generally described in U.S. Pat. No. 4,891,111.
[3]A cationic microgel prepared as generally described in Examples A and B of U.S. Pat. No. 5,096,556, with the exception that acetic acid instead of lactic acid was used to disperse the soap of Example A, ethylene glycol butyl ether instead of MIBK was used as a solvent in the soap of Example A, and EPON 828 solution was added after stripping rather than before in Example B. The resin had a final solids content of 18.3%.
[4]A pigment paste commercially availble from PPG Industries, Inc., containing 27.2% titanium dioxide, 1.4% carbon black, 15.9% aluminum silicate, 5.7% basic lead silicate, and 3.8% dibutyltin oxide.

EXAMPLE IB

This example describes the preparation of a cationic electrodeposition bath containing 0.79% benzohydroxamic acid on total solids (1.10% on main vehicle solids). The bath was prepared from the following ingredients:

| Ingredients | Parts by Weight |
| --- | --- |
| Main vehicle of Example IA | 1373.8 |
| Co-resin 1 of Example IA, prepared at 36.2% solids | 168.2 |
| Butyl CARBITOL formal plasticizer | 27.1 |
| Lactic acid, 88% solution | 2.4 |
| Benzohydroxamic acid[1] | 6.3 |
| Co-resin 2 of Example IA | 73.9 |
| Deionized water | 1957.0 |
| E6066 paste | 191.3 |
| TOTAL | 3800.0 |

[1]Available from Aldrich Chemical Co., Cat. No. 41226-0, 1994–1995 Catalogue.

The benzohydroxamic acid was dissolved in a premix of co-resin 1, butyl CARBITOL formal and 88% lactic acid, which was then added to the main vehicle, followed by the addition of the other ingredients.

EXAMPLE IC

This example describes the preparation of a cationic electrodeposition bath containing 1.23% N-phenyl benzohydroxamic acid on total solids (1.7% on main vehicle solids). The bath was prepared from the following ingredients:

| Ingredients | Parts by Weight |
|---|---|
| Main vehicle of Example IA | 1365.4 |
| Co-resin of Example IA | 172.0 |
| Butyl CARBITOL formal plasticizer | 27.1 |
| Lactic acid, 88% solution | 2.4 |
| N-Phenyl Benzohydroxamic acid[1] | 9.81 |
| Co-resin 2 of Exampie IA | 73.9 |
| Deionized water | 1964.09 |
| E6066 paste | 191.3 |
| TOTAL | 3800.0 |

[1]Available from Aldrich Chemical Co., Cat. No. 27,485-2, 1994–1995 Catalogue.

As in Example IB, the N-phenyl benzohydroxamic acid was predissolved in a mixture of co-resin 1, butyl CARBITOL formal, and 88%. lactic acid.

EXAMPLE ID

This example describes the preparation of a cationic electrodeposition bath containing 1.73% oleyl hydroxamic acid on total solids (2.40% on main vehicle solids). Since oleyl hydroxamic acid is not soluble in the co-resin-plasticizer-acid mixture of Examples IB and IC, it was predissolved in main vehicle. The oleyl hydroxamic acid was prepared from the following ingredients:

| Charge | Weight(g) | Solids | Moles | Equiv. | Equiv. Wt. |
|---|---|---|---|---|---|
| 1. Hydroxylamine sulfate | 123 | 123 | 0.75 | 1.50 | 82.07 |
| 2. Water | 200 | — | — | — | — |
| 3. 40% aq. sodium hydroxide | 225 | — | 2.25 | 2.25 | 40.00 |
| 4. Methanol | 600 | — | — | — | — |
| 5. Methyl oleate | 222 | — | 0.75 | 0.75 | 296.50 |

The hydroxylamine sulfate was dissolved in the water and the mixture cooled under ice. The sodium hydroxide was added dropwise while maintaining the temperature of the mixture below 30° C. using ice. The mixture was held for 30 minutes, quenched in an ice bath to 5° C., and salts were vacuum filtered off. To the filtrate, methanol and methyl oleate were added at room temperature and the mixture was stirred for one hour. Sulfuric acid was added to adjust the pH to 6–7. Methanol was evaporated off and the product was extracted with ethyl acetate. The product was dried with sodium sulfate, filtered, and evaporated to concentrate.

A main vehicle was prepared from the oleyl hydroxamic acid and other ingredients as follows, using the same procedure as described in Example IA, except that the final reaction mixture was cooled to 106° C., at which point the oleyl hydroxamic acid was added, and the reaction mixture was mixed for five minutes before being dispersed into the mixture of water and sulfamic acid:

| Ingredients | Parts by Weight |
|---|---|
| EPON 828 | 614.68 |
| Bisphenol A-ethylene oxide adduct (1/6 molar ratio) | 250.00 |
| Bisphenol A | 265.42 |

-continued

| Ingredients | Parts by Weight |
|---|---|
| Methyl isobutyl ketone | 59.48 |
| Ethyltriphenyl phosphonium iodide | 0.6 |
| Crosslinker of Example IA | 682.85 |
| Diketimine of Example IA | 56.01 |
| N-methyl ethanolamine | 48.68 |
| Oleyl hydroxamic acid | 58.76 |

The final product had a solids content of 43.7 percent and a particle size of 840 Angstroms.

A cationic electrodeposition bath was prepared from the following ingredients:

| Ingredients | Parts by Weight |
|---|---|
| Above main vehicle of ID | 1315.9 |
| Co-resin 1 of Example IA, prepared at 35.9% solids | 169.6 |
| Butyl CARBITOL formal plasticizer | 27.1 |
| Co-resin 2 of Example IA | 73.9 |
| Deionized water | 2022.2 |
| E6066 paste | 191.3 |
| TOTAL | 3800.0 |

EXAMPLE IE

This example describes the preparation of a cationic electrodeposition bath containing 0.88% N-methyl benzohydroxamic acid on total solids (1.26% on main vehicle solids).

N-methyl benzohydroxamic acid was prepared from the following ingredients:

| Charge | Compound | Weight | Equiv. Wt. | Equiv. |
|---|---|---|---|---|
| I | n-methyl Hydroxylamine-HCl | 12.53 g | 83.52 | 0.15 mole |
| I | m-pyrol | 80.0 g | | |
| II | benzoyl chloride | 21.08 g | 140.57 | 0.15 mole |
| III | water | 250 g | | |

The n-methyl hydroxylamine-HCl and m-pyrol were combined in a 250 milliliter (ml) round bottomed flask, cooled in an ice bath, and allowed to mix until most of the salt dissolved. The benzoyl chloride was slowly added over 15 minutes and allowed to stir for 1 hour. The water was then added and the product extracted three times with ethyl acetate. The ethyl acetate was evaporated from the product, and the product dissolved in 200 ml of 5% NaOH. The product was then extracted three times with 100 ml methylene chloride. The aqueous layer was acidified with $H_2SO_4$ to a pH of 6 and then extracted three times with 100 ml of ethyl acetate. The organic layer was dried with $MgSO_4$ and silica gel, and evaporated to dryness yielding n-methylbenzohydroxamic acid.

A cationic electrodeposition bath was prepared from the following ingredients:

| Ingredients | Parts by Weight |
|---|---|
| Main vehicle of Example IA, prepared at 41.2% solids | 1378.9 |

-continued

| Ingredients | Parts by Weight |
|---|---|
| Co-resin 1 of Example IA, prepared at 35.9% solids | 169.6 |
| Butyl CARBITOL formal plasticizer | 27.1 |
| N-methyl benzohydroxarnic acid | 7.0 |
| Co-resin 2 of Example IA | 73.9 |
| Deionized water | 1952.2 |
| E6066 paste | 191.3 |
| TOTAL | 3800.0 |

The N-methyl benzohydroxamic acid was predissolved in the co-resin 1 and the butyl CARBITOL formal plasticizer.

EXAMPLE IF

This example describes the preparation of a cationic electrodeposition bath containing 1.09% decyl hydroxamic acid on total solids (1.51% on main vehicle solids). As in Example ID, it was necessary to dissolve the decyl hydroxamic acid into the main vehicle rather than the co-resin 1, butyl CARBITOL formal, lactic acid mixture.

Decyl hydroxamic acid was prepared from the following ingredients:

| Charge | Compound | Weight | Equiv. Wt. | Equiv. |
|---|---|---|---|---|
| I | Water | 160 | N/A | |
| I | Sodium Hydroxide | 60 | 40.01 | 1.5 |
| II | Hydroxyl amine sulfate | 180.55 | 82.07 | 2.2 |
| III | Methanol | 700 | N/A | |
| IV | Methyl decanoate | 149 | 186.3 | 0.8 |
| V | Water | 1200 | | |
| V | Sodium hydroxide | 32 | | 0.8 |

The sodium hydroxide was dissolved in water in a suitable reactor and cooled with an ice bath to room temperature. The hydroxyl amine sulfate was added slowly to the mixture in the ice bath to prevent evolution of hydroxyl amine. The temperature was not allowed to exceed 300° C. Stirring continued until the solution was clear, indicating that all solids were dissolved. The mixture was then cooled in an ice bath to less than 5° C. Salts were filtered off. The methanol was added and the mixture stirred for 10 minutes. Any additional salts were removed by vacuum filter. Methyl decanoate was added to the filtrate and the mixture was stirred at room temperature and allowed to stand overnight. The water and sodium hydroxide of Charge V were premixed and added to the filtrate to precipitate the salt. The precipitate was collected by filtration and then recrystallized in ethyl acetate yielding decyl hydroxamic acid.

A main vehicle was prepared from the decyl hydroxamic acid and the following ingredients using the same procedure as described in Example IA, except that the final reaction mixture was cooled to 100° C., at which point the decyl hydroxamic acid was added, and the reaction mixture was mixed for five minutes before being dispersed into the mixture of water and sulfamic acid:

| Ingredients | Parts by Weight |
|---|---|
| EPON 828 | 614.68 |
| Bisphenol A-ethylene oxide adduct (1/6 molar ratio) | 250.00 |
| Bisphenol A | 265.42 |
| Methyl isobutyl ketone | 59.48 |
| Ethyltriphenyl phosphonium iodide | 0.6 |
| Crosslinker of Example IA | 682.85 |
| Diketimine of Example IA | 56.01 |
| N-methyl ethanolamine | 48.68 |
| Decyl hydroxamic acid | 28.03 |

The final product had a solids content of 42.04 percent and a particle size of 840 Angstroms.

A cationic electrodeposition bath was prepared from the following ingredients:

| Ingredients | Parts by Weight |
|---|---|
| Above main vehicle | 1367.7 |
| Co-resin 1 of Example IA, prepared at 35.9% solids | 169.6 |
| Butyl CARBITOL formal | 27.1 |
| Co-resin 2 of Example IA | 73.9 |
| Deionized water | 1970.4 |
| E6066 paste | 191.3 |
| TOTAL | 3800.0 |

The baths of Examples IA through IF were ultrafiltered, removing 20 percent of the total weight of the bath as ultrafiltrate and replacing the ultrafiltrate with deionized water. Zinc phosphated steel panels and unphosphated steel panels both available from Applied Coating Technology Inc. (ACT) as (Bonderite 962–APR 10739) and (APR 28110), respectively, were electrocoated with the electrodepositable compositions at 275 volts for two minutes at bath temperatures of 88°–92° F. (31.1°–33.3° C.), rinsed with deionized water, and baked at various temperatures. Resulting film builds were about 0.9 mil (22.9 microns). The panels were evaluated for appearance, cure, and corrosion resistance as shown in Table I.

TABLE I

| | | | | Bare Steel Corrosion Resistance | |
|---|---|---|---|---|---|
| Example No. | Additive | Appearance[1] ($R_A$, 30' @ 340° F.) ($\mu$-In.) | Cure[2] (Acetone Resistance, 30' @ 310° F.) | 10 days[3] Warm Salt Solution (30' @ 340° F.) (mm. Creep) | 40 Cycles[4] GM9540P, Method B (30' @ 340° F.) (mm. Creep) |
| IA | None | 13.0 | 30 | 15.5 | 14 |
| IB | Benzohydroxamic Acid | 10.7 | >100 (Soft) | 3 | 10.5 |

TABLE I-continued

| Example No. | Additive | Appearance[1] (R$_A$, 30' @ 340° F.) (μ-In.) | Cure[2] (Acetone Resistance, 30' @ 310° F.) | Bare Steel Corrosion Resistance | |
|---|---|---|---|---|---|
| | | | | 10 days[3] Warm Salt Solution (30' @ 340° F.) (mm. Creep) | 40 Cycles[4] GM9540P, Method B (30' @ 340° F.) (mm. Creep) |
| IC | N-Phenyl Benzo-hydroxamic Acid | 6.9 | >100 | | |
| ID | Oleyl Hydroxamic Acid | 7.4 | >100 (v. slight mar) | 6.5 | 13 |
| IE | N-methyl Benzo-hydroxamic Acid | 8.0 | >100 | 7.5 | 12 |
| IF | Decyl Hydroxamic Acid | 7.6 | >100 (Soft) | 7 | 12.5 |

The data in Table I indicate significant improvement in the properties of coatings, including appearance, cure and/or corrosion resistance when hydroxamic acid derivatives are added to coating compositions in accordance with the present invention. cl EXAMPLE II Examples IIA through IIF illustrate how the lead silicate content of a cationic electrodeposition composition can be reduced from 1.5% to 0.06% of total solids.

EXAMPLE IIA

Example IIA describes the preparation of a cationic electrodeposition bath containing 1.5% lead silicate on total solids and no additive. A main vehicle was prepared from the following ingredients:

| Ingredients | Parts by Weight |
|---|---|
| EPON 828 | 1019.25 |
| Bisphenol A-ethylene oxide ⅙ | 366.08 |
| Bisphenol A | 297.45 |
| Methyl isobutyl ketone | 88.65 |
| Benzyldimethylamine | 1.44 |
| Benzyldimethylamine | 4.28 |
| Crosslinker[1] | 1779.19 |
| Diketimine of Example IA | 112.28 |
| N-methylethanolamine | 98.42 |
| Sulfamic acid | 92.99 |
| Deionized water | 2167.23 |
| Deionized water | 1359.95 |
| Deionized water | 2137.07 |
| Polyisocyanate[a] | 4095 |
| Methyl isobutyl ketone | 2199.6 |
| Dibutyltin dilaurate | 6.2 |
| 2-(2-Butoxyethoxy)ethanol | 3353 |
| Trimethylolpropane | 356.1 |
| 2-(2-Butoxyethoxy)ethanol | 464.2 |

[1]A capped polyisocyanate crosslinker was prepared from the following mixture of ingredients:
[a]Polymeric diphenylmethane diisocyanate available from Bayer Corp. as MONDUR MRS-4.
The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60° C. to 65° C. Upon completion of the addition, the reaction mixture was held at 65° C. for 90 minutes. The trimethylolpropane was then added and the mixture heated to 110° C. and held there for three hours whereupon the final portion of the 2-(2-butoxyethoxy) ethanol was added. The 110° C. hold was continued until infrared analysis indicated no unreacted NCO remained.

The EPON 828 (diglycidyl ether of Bisphenol A from Shell Chemical Co.), Bisphenol A-ethylene oxide adduct, Bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one-half hour, cooled further to 145° C. and the second portion of benzyldimethylamine added. The reaction was held at 145° C. until a reduced Gardner-Holdt viscosity (50 percent resin solids in 2-methoxypropanol) of P+ was obtained. At this point, the crosslinker, the diketimine and N-methylethanolamine were added in succession. The reaction was then completed during a hold of one hour at 125° C. The mixture was then dispersed by pouring it into an agitated mixture of sulfamic acid and the first portion of deionized water. The dispersion was further thinned in stages with the second and third portions of deionized water and vacuum stripped to remove organic solvent, yielding a final dispersion of 43.7 percent solids and a particle size of 963 Angstroms.

A cationic electrodeposition bath was prepared from the following ingredients:

| Ingredients | Parts by Weight |
|---|---|
| Above main vehicle | 1326.5 |
| Co-resin 1 of Example IA, prepared at 36.2% solids | 172.7 |
| Paraplex WP-1[1] | 41.7 |
| Co-resin 2 of Example IA | 56.8 |
| Deionized water | 1977.3 |
| E6066 paste | 225.0 |
| TOTAL | 3800.0 |

[1]Reaction product of cresol and propylene oxide, available from Rohm and Haas Co.

EXAMPLE IIB

This example describes the preparation of a cationic electrodeposition bath with no lead silicate and no corrosion-resistant additive.

A pigment grinding vehicle was prepared for the electrodeposition bath by first preparing a quaternizing agent followed by reacting the quaternizing agent with an epoxy resin. The quaternizing agent was prepared as follows:

| Ingredients | Solution weight (grams) | Solid Weight |
|---|---|---|
| 2-Ethylhexanol half-capped toluene diisocyanurate in MIBK | 320 | 304 |
| Dimethylethanolamine (DMEA) | 87.2 | 87.2 |

-continued

| Ingredients | Solution weight (grams) | Solid Weight |
|---|---|---|
| Aqueous lactic acid solution | 117.6 | 58.2 |
| 2-Butoxyethanol | 39.2 | — |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by the addition of 2-butoxyethanol. The reaction mixture was stirred for about one hour at 65° C. to form the quaternizing agent.

The pigment grinding vehicle was prepared as follows:

| Ingredients | Solution weight (grams) | Solid Weight |
|---|---|---|
| EPON 829[a] | 710 | 682 |
| Bisphenol A | 289.6 | 289.6 |
| 2-Ethylhexanol half-capped toluene diisocyanate in MIBK | 406 | 386.1 |
| Quaternizing agent described above | 496.3 | 421.9 |
| Deionized water | 71.2 | — |
| 2-Butoxyethanol | 1490 | — |

[a]Diglycidyl ether of Bisphenol A available from Shell Oil and Chemical Co.

The EPON 829 and Bisphenol A were charged under a nitrogen atmosphere to a suitable reactor and heated to 150° C. to 160° C. to initiate an exotherm. The reaction mixture was permitted to exotherm for one hour at 150° C. to 160° C. The reaction mixture was then cooled to 120° C. and the 2-ethylhexanol half-capped toluene diisocyanate added. The temperature of the reaction mixture was held at 110° C. to 120° C. for one hour followed by the addition of the 2-butoxyethanol. The reaction mixture was then cooled to 85° C. to 90° C., homogenized and charged with water followed by the quaternizing agent. The temperature of the reaction mixture was held at 80° C. to 85° C. until an acid value of about 1 was obtained. The final product had a solids content of about 57.1.

A catalyst paste was prepared from the following ingredients:

| Ingredients | Parts by Weight |
|---|---|
| Pigment grinding vehicle as prepared above for Example IIB | 137.9 |
| Dibutyltin oxide | 200 |
| Deionized water | 268.2 |

The paste was sand milled to a Hegman reading of 7.

A pigment paste was prepared from the following ingredients:

| Ingredients | Parts by Weight |
|---|---|
| Pigment grinding vehicle | 1167.8 |
| Deionized water | 2011.8 |
| Titanium dioxide[1] | 2449.6 |
| Aluminum silicate[2] | 1428.8 |
| Carbon black[3] | 121.6 |

[1]Available from E. I. Dupont de Nemours and Co. as R-900.
[2]Available from Engelhard Corp. as ASP-200.
[3]Available from the Columbian Division of Cities Service Co. as Raven 410.

The pigment paste was sand milled to a Hegman reading of 7.

A cationic electrodeposition bath was prepared from the following ingredients.

| Ingredients | Parts by Weight |
|---|---|
| Main vehicle of Example IIA | 1369.2 |
| Co-resin 1 of Example IA, prepared at 36.2% solids | 172.6 |
| Paraplex WP-1 | 41.7 |
| Deionized water | 1998.4 |
| Pigment paste | 218.1 |
| Catalyst paste | 27.7 |
| TOTAL | 3827.7 |

EXAMPLE IIC

This example describes the preparation of a cationic electrodeposition bath with 0.06% lead silicate on total solids and no corrosion-resistant additive.

An unsolubilized version of co-resin 1 of Example IA was prepared from the following ingredients:

| Ingredients | Parts by Weight |
|---|---|
| Jeffamine D-2000[1] | 2284.58 |
| EPON 1001 solution in 2-butoxy ethanol[2] | 1097.46 |
| 2-butoxy ethanol | 271.98 |

[1]A polyoxyalkylene diamine having molecular weight of 2,000, available from Texaco Company.
[2]EPON 1001 solution in 2-butoxy ethanol was prepared from the following ingredients:

| Ingredients | Parts by Weight |
|---|---|
| EPON 828 | 2256 |
| Bisphenol A | 684 |
| Ethyltriphenyl phosphonium iodide | 2.26 |
| 2-butoxy ethanol | 980 |

The EPON 828 and Bisphenol A were charged to a reaction vessel and heated under nitrogen blanket to 125° C. The ethyltriphenyl phosphonium iodide was added and the reaction was allowed to exotherm to 160° C. The resultant mixture was held at 160° C. for one hour followed by the addition of 2-butoxy ethanol to give the epoxy solution.

The Jeffamine D-2000 was charged into a properly equipped reaction vessel, heated under nitrogen blanket to 90° C. followed by addition to the EPON 1001 solution in 2-butoxy ethanol. The reaction mixture was heated to 130° C. and held for three hours. 2-butoxy ethanol was then added to the mixture.

A cationic electrodeposition bath was prepared from the following ingredients:

| Ingredients | Parts by Weight |
| --- | --- |
| Main vehicle ot Example IIA | 1346.5 |
| Above unsolubilized co-resin 1 | 73.3 |
| Paraplex WP-1 | 41.5 |
| Lactic acid, 88% solution | 5.3 |
| Deionized water | 241.0 |
| Deionized water | 1861.5 |
| Pigment paste of Example IIB | 194.6 |
| E 6066 paste | 8.6 |
| Catalyst Paste of Example IIB | 27.7 |
| TOTAL | 3800.0 |

The unsolubilized co-resin 1, Paraplex WP-1, and lactic acid were premixed and slowly solubilized under agitation with the first portion of deionized water. This solubilized premix was then added under agitation to the main vehicle and the remaining ingredients were then added in order.

EXAMPLE IID

This example describes the preparation of a cationic electrodeposition bath with 0.06% lead silicate on total solids and 0.83% benzohydroxamic acid on total solids (1.16% on main vehicle solids). The bath was prepared from the following ingredients, using the procedure of Example IIC, with the benzohydroxamic acid included in the premix of unsolubilized co-resin 1, Paraplex WP-1, and lactic acid:

| Ingredients | Parts by Weight |
| --- | --- |
| Main vehicle of Example IIA | 1330.7 |
| Unsolubilized co-resin 1 of Example IIC | 73.3 |
| Paraplex WP-1 | 41.5 |
| Benzohydroxamic acid | 6.9 |
| Lactic acid, 88% solution | 5.3 |
| Deionized water | 241.0 |
| Deionized water | 1870.4 |
| Pigment paste of Example IIB | 194.6 |
| E 6066 paste | 8.6 |
| Catalyst paste of Example IIB | 27.7 |
| TOTAL | 3800.0 |

EXAMPLE IIE

This example describes the preparation of a cationic electrodeposition bath with 0.06% lead silicate on total solids and 0.83% N-methylbenzohydroxamic acid on total solids (1.16% on main vehicle solids). The bath was prepared as in Example IID, except that 6.9 parts N-methyl benzohydroxamic acid was used in place of the benzohydroxamic acid.

EXAMPLE IIF

This example describes the preparation of a cationic electrodeposition bath with 0.06% lead silicate on total solids and 1.06% decyl hydroxamic acid on total solids (1.48% on main vehicle solids). Due to the low solubility of decyl hydroxamic acid, it was again necessary to incorporate it into the main vehicle. The main vehicle was prepared from the following ingredients, using the procedure of Example IIA, except that the final reaction mixture was cooled to 100° C., at which point the decyl hydroxamic acid was added, and the reaction mixture was mixed for five minutes before being dispersed into the mixture of water and sulfamic acid:

| Ingredients | Parts by Weight |
| --- | --- |
| EPON 828 | 680.90 |
| Bisphenol A-ethylene oxide adduct (1/6 molar ratio) | 242.90 |
| Bisphenol A | 199.2 |
| Methyl isobutyl ketone | 59.11 |
| Benzyldimethylamine | 1.0 |
| Benzyldimethylamine | 2.74 |
| Crosslinker of Example IIA | 1187.57 |
| Diketimine of Example IA | 75.53 |
| N-methyl ethanolamine | 65.73 |
| Decylhydroxamic acid | 33.38 |

The final product had a solids content of 45.4 percent and a particle size of 940 Angstroms.

A cationic electrodeposition bath was prepared from the following ingredients, using the procedure of Example IIC:

| Ingredients | Parts by Weight |
| --- | --- |
| Above main vehicle | 1296.1 |
| Unsolubilized co-resin 1 of Example IIC | 73.3 |
| Paraplex WP-1 | 41.5 |
| Lactic acid, 88% solution | 5.3 |
| Deionized water | 241.0 |
| Deionized water | 1911.9 |
| Pigment paste of Example IIB | 194.6 |
| E 6066 paste | 8.6 |
| Catalyst paste of Example IIB | 27.7 |
| TOTAL | 3800.0 |

The baths of Examples IIA through IIF were ultrafiltered, removing 30 percent of the total weight of the bath as ultrafiltrate and replacing the ultrafiltrate with deionized water. Unphosphated steel panels were cleaned using acetone and mineral spirits and then electrocoated at 225 to 250 volts for two minutes at 80° F. to 84° F. (26.7° C. to 28.9° C.), rinsed with deionized water and baked for 30 minutes at 340° F. (171.1° C.) to produce a baked film thickness of 1.2 to 1.3 mils (30.5 to 33.0μ). The electrocoated bare steel panels were tested for corrosion resistance with results as described on Table II.

TABLE II

| Example No. | % Lead Silicate on Total Solids of bath | Additive | Bare Steel Corrosion Resistance | |
|---|---|---|---|---|
| | | | 10 days Warm Salt Solution (mm. Creep) | 30 Cycles GM9540P, Method B (mm. Creep) |
| IIA | 1.5 | None | 11 | 13 |
| IIB | 0 | None | 32 | 25 |
| IIC | 0.06 | None | 26 | 18 |
| IID | 0.06 | Benzohydroxamic Acid | 13 | 15 |
| IIE | 0.06 | N-methyl Benzo-hydroxamic Acid | 15 | 14 |
| IIF | 0.06 | Decyl Hydroxamic Acid | 14 | 13 |

The data in Table II indicate that bare steel corrosion resistance can be maintained in coating compositions containing lowered levels of lead, with the addition of hydroxamic acid derivatives, in particular, benzohydroxamic acid, N-methyl benzohydroxamic acid, or decyl hydroxamic acid, in accordance with the present invention.

EXAMPLE III

Examples IIIA through IIIJ illustrate the effect of adding the hydroxamic acid derivatives of the present invention to cationic electrodeposition compositions while reducing dibutyltin oxide levels.

EXAMPLES IIIA THROUGH IIIJ

A dibutyltin oxide free pigment paste was prepared from the following ingredients:

| Ingredients | Parts by Weight |
|---|---|
| Grind vehibcle of Example IIB | 1515.5 |
| Deionized water | 2659.0 |
| Titanium dioxide of Example IIB | 2712.5 |
| Aluminum silicate of Example IIB | 1582.5 |
| Carbon black of Example IIB | 134.5 |
| Basic lead silicate[1] | 570.5 |
| TOTAL | 9174.5 |

[1]Available from Eagle-Picher Industries, Inc. as EP202.

The pigment paste was sand milled to a Hegman reading of 7.

The above pigment paste was combined with other ingredients to form ten cationic electrodeposition baths as described on Table III, where the values given are parts by weight. In Examples IIIB, IIIC, IIID, IIIE, IIIF, and IIIG, the hydroxamic acid additives were predissolved in a mixture of co-resin 1, butyl CARBITOL formal, and lactic acid in a manner similar to that of Example IB.

TABLE III

| | Example | | | | | | | | | |
|---|---|---|---|---|---|---|---|---|---|---|
| | IIIA | IIIB | IIIC | IIID | IIIE | IIIF | IIIG | IIIH | III-I | IIIJ |
| Main vehicle of Example IA, prepared at 41.8% solids | 1372.5 | 1359.7 | 1360.9 | 1361.9 | 1352.6 | 1353.8 | 1354.7 | — | — | — |
| Main vehicle of Example IF, prepared at 42.4% solids | — | — | — | — | — | — | — | 1352.1 | 1353.3 | 1354.3 |
| Co-resin 1 of Example IA, prepared at 35.5% solids | 171.1 | 169.5 | 169.7 | 169.8 | 168.6 | 168.8 | 168.9 | 171.1 | 171.3 | 171.4 |
| Butyl CARBITOL formal plasticizer | 27.0 | 26.8 | 26.8 | 26.8 | 26.6 | 26.6 | 26.7 | 27.0 | 27.0 | 27.0 |
| Benzohydroxamic acid | — | 6.3 | 6.3 | 6.3 | — | — | — | — | — | — |
| N-phenyl benzohydroxamic acid | — | — | — | — | 9.8 | 9.8 | 9.8 | — | — | — |
| Lactic acid, 88% solution | 2.5 | 2.5 | 2.5 | 2.5 | 2.5 | 2.5 | 2.5 | 2.5 | 2.5 | 2.5 |
| Co-resin 2 of Example IA | 74.6 | 73.9 | 73.9 | 74.0 | 73.5 | 73.5 | 73.6 | 74.6 | 74.6 | 74.7 |
| Deionized water | 1950.9 | 1959.9 | 1962.1 | 1963.9 | 1965.0 | 1967.2 | 1969.0 | 1971.3 | 1973.5 | 1975.3 |
| Above pigment paste | 177.3 | 177.3 | 181.9 | 185.7 | 177.3 | 181.9 | 185.7 | 177.3 | 181.9 | 185.7 |
| Catalyst paste of Example IIB | 24.1 | 24.1 | 15.9 | 9.1 | 24.1 | 15.9 | 9.1 | 24.1 | 15.9 | 9.1 |
| TOTAL | 3800.0 | 3800.0 | 380.0 | 3800.0 | 3800.0 | 3800.0 | 3800.0 | 3800.0 | 3800.0 | 3800.0 |

The ten cationic electrodeposition baths of Examples IIIA through IIIJ were ultrafiltered, removing 20 percent of the total weight of the bath as ultrafiltrate and replacing the ultra-filtrate with deionized water. Zinc phosphated steel panels were electrocoated with the electrodepositable compositions at 275 volts for two minutes at 87° F. to 90° F. (30.6° C. to 32.2° C.) resulting in cured film builds of about 0.9 mil (22.9 microns). Panels were baked for 30 minutes at 310° F. (154.4° C.) and checked for acetone resistance and baked for 30 minutes at 340° F. (171.1° C.) and evaluated for appearance. In addition, electrocoated films were evaluated for cure rate by Thermo-Gravimetric Analysis (TGA). Results are reported in Table IV.

TABLE IV

| Example No. | % Dibutyl Tin Oxide on Total Solids of Bath | Additive | 30' @ 340° F. Bath Aged 2 weeks Appearance ($R_A$, $\mu$-in.) | 30' @ 310° F. Acetone Resistance, Double rubs to metal | TGA[1] % Wt. Loss/Min$_2$ × $10^3$ 340° F. |
|---|---|---|---|---|---|
| IIIA | 0.91 | None | 16.6 | >100 (very soft) | 45.7 |
| IIIB | 0.91 | Benzohydroxamic acid | 8.4 | >100 (soft) | 38.8 |
| IIIC | 0.60 | Benzohydroxamic acid | 9.3 | >100 (very soft) | 20.8 |
| IIID | 0.34 | Benzohydroxamic acid | 12.5 | 45 | 18.8 |
| IIIE | 0.91 | N-phenyl Benzohydroxamic acid | 7.3 | >100 (slight mar) | 112.0 |
| IIIF | 0.60 | N-phenyl Benzohydroxamic acid | 7.9 | >100 (slightly soft) | 89.8 |
| IIIG | 0.34 | N-phenyl Benzohydroxamic acid | 7.8 | >100 (soft) | 61.7 |
| IIIH | 0.91 | Decyl hydroxamic acid | 11.0 | >100 (soft | 121.0 |
| III-I | 0.60 | Decyl hydroxamic acid | 10.1 | >100 (soft) | 65.4 |
| IIIJ | 0.34 | Decyl hydroxamic acid | 11.0 | >100 (slightly soft) | 48.0 |

[1]Thermo-Gravimetric Analysis: The weight loss of a curing coating is monitored versus time for thirty (30) minutes at 340° F. (162.7° C.). The linear portion of the plot of the rate of change of the rate of weight loss versus time is recorded, expressed as percent weight loss per square minute times $10^3$ (% weight loss/min$^2$ × $10^3$). The higher the values, the faster the weight loss and the greater the cure rate.

The data in Table IV indicate how tin levels can be reduced in cationic electrodeposition compositions while maintaining cure and/or appearance, by adding the hydroxamic acid additives in accordance with this invention. Using N-phenyl benzohydroxamic acid or decyl hydroxamic acid, dibutyltin oxide can be reduced from 0.91% on solids to as low as 0.34% on solids, with cure and appearance remaining as good as or better than that of a control containing 0.91% dibutyltinoxide with no additive. Addition of benzohydroxamic acid to the electrodepositable composition resulted in improved appearance.

We claim:

1. An electrodepositable composition comprising (a) active hydrogen-containing, cationic salt group-containing resin electrodepositable on a cathode; (b) at least one at least partially capped polyisocyanate curing agent; (c) at least one metal-containing catalyst selected from the group consisting of lead-containing compounds; and (d) at least one material having the following general formula:

wherein $R_1$ is alkyl or substituted alkyl having 1 to 18 carbon atoms or aryl or substituted aryl; and $R_2$ is hydrogen, alkyl or substituted alkyl having 1 to 18 carbon atoms or aryl or substituted aryl.

2. The electrodepositable composition of claim 1 in which the cationic salt group-containing resin is derived from a polyepoxide.

3. The electrodepositable composition of claim 2 in which the polyepoxide is a polyglycidyl ether of a polyhydric alcohol.

4. The electrodepositable composition of claim 2 in which the cationic salt groups are amine salt groups.

5. The electrodepositable composition of claim 4 in which the amine salt groups are derived from basic nitrogen groups neutralized with an acid selected from the group consisting of formic acid, acetic acid, lactic acid, phosphoric acid, sulfamic acid and mixtures thereof.

6. The electrodepositable composition of claim 1 in which $R_1$ is selected from the group consisting of nonyl and phenyl.

7. The electrodepositable composition of claim 1 in which $R_2$ is selected from the group consisting of phenyl, methyl, and hydrogen.

8. The electrodepositable composition of claim 1 in which $R_1$ is nonyl and $R_2$ is hydrogen.

9. The electrodepositable composition of claim 1 in which the metal-containing catalyst is present in amounts of about 0.05 to 2 percent metal by weight, based on weight of total solids.

10. The electrodepositable composition of claim 1 which is curable at a temperature range of about 275° to 400° F. (135° to 204.4° C.).

11. The electrodepositable composition of claim 1 which is curable at a temperature range of about 300° to 340° F. (148.8° to 171.1° C.).

12. The electrodepositable composition of claim 1 wherein the capped polyisocyanate curing agent is present in the electrodepositable composition in an amount ranging from about 5 to 60 percent by weight based on total weight of resin solids.

13. The electrodepositable composition of claim 12 wherein the capped polyisocyanate curing agent is present in the electrodepositable composition in an amount ranging from about 25 to 50 percent by weight based on total weight of resin solids.

14. The electrodepositable composition of claim 1 wherein the active hydrogen-containing, cationic salt group-containing electrodepositable resin is present in the electrodepositable composition in an amount ranging from about 40 to 90 percent by weight based on total weight of resin solids.

15. The electrodepositable composition of claim 1 wherein component (d) is present in the electrodepositable composition in an amount ranging from about 0.1 to 3.0 percent by weight based on weight of active hydrogen-containing cationic resin solids and capped polyisocyanate curing agent solids.

16. An electrodepositable composition comprising (a) active hydrogen-containing, cationic salt group-containing resin electrodepositable on a cathode; (b) at least one at least partially capped polyisocyanate curing agent; (c) at least one metal-containing catalyst; and (d) at least one material having the following general formula:

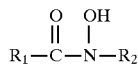

in which $R_1$ is phenyl and $R_2$ is phenyl.

17. The electrodepositable composition of claim 16 in which the metal-containing catalyst is selected from the group consisting of lead-containing catalysts.

18. A method of electrocoating an electroconductive substrate which serves as a cathode in an electrical circuit comprising said cathode and an and immersed in an aqueous electrodepositable composition containing a cationic water dispersible resin, said method comprising passing an electric current between the anode and the cathode to cause electrodepositable composition to deposit on the cathode as a substantially continuous film, and heating the electrodeposited film at an elevated temperature to cure the film, wherein the electrodepositable composition comprises (a) active hydrogen-containing, cationic salt group-containing resin electrodepositable on a cathode; (b) at least one at least partially capped polyisocyanate curing agent; (c) at least one metal-containing catalyst select from the group consisting of lead-containing compounds; and (d) at least one material having the following general formula:

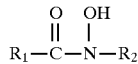

wherein $R_1$ is alkyl or substituted allyl having 1 to 18 carbon atoms or aryl or substituted aryl; and $R_2$ is hydrogen, alkyl or substituted alkyl having 1 to 18 carbon atoms or aryl or substitute aryl.

19. The method of claim 18 in which the cationic resin is derived from a polyepoxide.

20. The method of claim 19 in which the polyepoxide is a polyglycidyl ether of a polyhydric alcohol.

21. The method of claim 18 wherein the cathode is a steel substrate.

22. The method of claim 18 in which the cationic salt groups are amine salt groups.

23. The method of claim 22 in which the amine salt groups are derived from basic nitrogen groups neutralized with an acid selected from the group consisting of formic acid, acetic acid, lactic acid, phosphoric acid, sulfamic acid and mixtures thereof.

24. The method of claim 18 in which $R_1$ is selected from the group consisting of nonyl and phenyl.

25. The method of claim 18 in which $R_2$ is selected from the group consisting of phenyl, methyl, and hydrogen.

26. The method of claim 18 in which $R_1$ is nonyl and $R_2$ is hydrogen.

27. The method of claim 18 in which the metal-containing catalyst is present in amounts of about 0.05 to 2 percent metal by weight, based on weight of total solids.

28. The method of claim 18 in which the electrodeposited film is heated to a temperature range of about 275° to 400° F. (135° to 204.4° C.) to cure the film.

29. The method of claim 18 in which the electrodeposited film is heated to a temperature range of about 300° to 340° F. (148.8° to 171.1° C.) to cure the film.

30. The method of claim 18 wherein the material of component (d) is decyl hydroxamic acid.

31. A method of electrocoating an electroconductive substrate which serves as a cathode in an electrical circuit comprising said cathode and an anode immersed in an aqueous electrodepositable composition containing a cationic water dispersible resin, said method comprising passing an electric current between the anode and the cathode to cause the electrodepositable composition to deposit on the cathode as a substantially continuous film, and heating the electrodeposited film at an elevated temperature to cure the film, wherein the electrodepositable composition comprises (a) active hydrogen-containing, cationic salt group-containing resin electrodepositable on a cathode; (b) at least one at least partially capped polyisocyanate curing agent; (c) at least one metal-containing catalyst; and (d) at least one material having the following general formula:

in which $R_1$ is phenyl and $R_2$ is phenyl.

32. The method of claim 31 in which the metal-containing catalyst is selected from the group consisting of lead-containing catalysts.

* * * * *

UNITED STATES PATENT AND TRADEMARK OFFICE
CERTIFICATE OF CORRECTION

PATENT NO. : 5,804,051

DATED : September 8, 1998

INVENTOR(S) : Boyd et al.

It is certified that error appears in the above-identified patent and that said Letters Patent are hereby corrected as shown below:

Please amend claim 18 in the following manner:

Column 25, line 14, in the phrase "comprising said cathode and an and immersed", please delete 'and' in the second instance and insert the word --anode--;

at line 17, after the word "cause", please insert the word --the--;

at line 25, delete the word "select" and insert the word --selected--; and at line 32, after the word "substituted", delete the word "allyl" and insert the word --alkyl--.

Signed and Sealed this

Eighth Day of May, 2001

Attest:

NICHOLAS P. GODICI

Attesting Officer

Acting Director of the United States Patent and Trademark Office